United States Patent
Roeder et al.

(10) Patent No.: US 7,548,166 B2
(45) Date of Patent: Jun. 16, 2009

(54) TINE-MOUNTED ANTENNA FOR AN RFID

(75) Inventors: William H. Roeder, Norcross, GA (US);
Donald L. Runyon, Dututh, GA (US);
Richard W. Sorenson, Jr., Atlanta, GA (US); Michael Sayre Clott, Marietta, GA (US)

(73) Assignee: EMS Technologies, Inc., Norcross, GA (US)

( * ) Notice: Subject to any disclaimer, the term of this patent is extended or adjusted under 35 U.S.C. 154(b) by 105 days.

(21) Appl. No.: 11/433,557

(22) Filed: May 15, 2006

(65) Prior Publication Data

US 2006/0255950 A1  Nov. 16, 2006

Related U.S. Application Data

(60) Provisional application No. 60/718,947, filed on Sep. 20, 2005, provisional application No. 60/680,925, filed on May 13, 2005.

(51) Int. Cl.
*G08B 13/14* (2006.01)

(52) U.S. Cl. ............ 340/572.7; 340/572.1; 340/686.5; 187/222; 187/237; 187/238

(58) Field of Classification Search ............ 340/572.7, 340/572.1, 572.4, 686.1, 686.4, 686.5, 10.1, 340/10.42; 187/222, 237, 238, 391
See application file for complete search history.

(56) References Cited

U.S. PATENT DOCUMENTS

| | | | |
|---|---|---|---|
| 5,604,485 A | 2/1997 | Lauro et al. | |
| 5,608,417 A | 3/1997 | de Vall | |
| 5,729,697 A | 3/1998 | Schkolnick et al. | |
| 6,057,765 A | 5/2000 | Jones et al. | |
| 6,166,638 A | 12/2000 | Brady et al. | |
| 6,332,098 B2 | 12/2001 | Ross et al. | |
| 6,496,806 B1 * | 12/2002 | Horwitz et al. | 705/28 |
| 6,600,418 B2 | 7/2003 | Francis et al. | |
| 6,669,089 B2 * | 12/2003 | Cybulski et al. | 235/385 |
| 6,703,935 B1 | 3/2004 | Chung et al. | |
| 6,750,771 B1 | 6/2004 | Brand | |
| 6,788,204 B1 | 9/2004 | Ianelli et al. | |
| 6,809,703 B2 | 10/2004 | Serra | |
| 7,036,734 B2 | 5/2006 | Baker | |
| 7,121,457 B2 * | 10/2006 | Michal, III | 235/375 |
| 7,151,979 B2 * | 12/2006 | Andersen et al. | 700/214 |
| 7,155,304 B1 * | 12/2006 | Charych | 700/214 |
| 7,221,269 B2 | 5/2007 | Onderko et al. | |
| 7,233,241 B2 | 6/2007 | Overhultz et al. | |
| 7,236,851 B2 * | 6/2007 | Charych | 700/214 |
| 7,243,476 B2 * | 7/2007 | Schneider | 53/399 |

(Continued)

FOREIGN PATENT DOCUMENTS

NL  9401836  6/1996

*Primary Examiner*—Toan N Pham
(74) *Attorney, Agent, or Firm*—Hogan & Hartson, LLP

(57) ABSTRACT

The present invention provides a tine-mounted antenna for reading RFID tags in a warehouse environment using RFID technology operating at ultra-high frequencies (UHF) or microwave frequencies and backscatter coupling techniques. At least one ruggedized antenna is mounted on the tine (or other base-level platform) of a lift truck (e.g., a forklift). The antenna can be configured to read RFID tags on pallets that are loaded on the lift truck and communicate the tag information to a warehouse management system.

34 Claims, 12 Drawing Sheets

U.S. PATENT DOCUMENTS

| | | |
|---|---|---|
| 2002/0130817 A1 | 9/2002 | Forster et al. |
| 2004/0102870 A1 | 5/2004 | Andersen et al. |
| 2005/0052281 A1 | 3/2005 | Bann |
| 2005/0076816 A1* | 4/2005 | Nakano .................. 108/51.11 |
| 2005/0200457 A1 | 9/2005 | Bridgelall et al. |
| 2006/0058913 A1* | 3/2006 | Andersen et al. ............ 700/214 |
| 2006/0132312 A1 | 6/2006 | Tavormina |
| 2006/0208893 A1 | 9/2006 | Anson et al. |

* cited by examiner

TINE-MOUNTED ANTENNA FOR AN RFID

CROSS REFERENCE TO RELATED APPLICATIONS

This application claims priority under 35 U.S.C. § 119(e) from U.S. Provisional Patent Application Nos. 60/680,925, filed on May 13, 2005, and 60/718,947, filed on Sep. 20, 2005, both of which are incorporated herein by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

This invention relates generally to antenna systems, and more particularly to vehicle-mounted antennas for use with warehouse management systems.

2. Description of Related Art

Current "best practices" employed in the movement and tracking of goods in warehouses and distribution centers include the use of barcode-based data collection and wireless networked computers on lift trucks and other mobile material handling equipment. While these technologies have greatly enhanced the efficiency and accuracy of warehousing operations over recent decades, they still fundamentally rely on manual data collection activity in the validation of material movement. Two aspects are key elements to enhance efficiency.

One aspect is automated data collection needs to be synchronized with operator directives and activity. Operators are typically presented with instructions from the warehouse management software application on the screen of a mobile wireless computer on the lift truck. Upon completion of the required action, the operator typically enters data through a bar code scan or keyboard entry to confirm accurate completion of the task. The information is transmitted over a wireless connection to the application on a network server. The application may then assign the operator the next task. Thus, the application and process require real-time, precise data, appropriate to the task and synchronous with operator actions and application instructions.

The second aspect is that almost all full pallet load moves require two basic data collection elements: (1) load identification and (2) location identification. If, for instance, a lift operator is instructed to drive to a particular location, he may then be required to scan a bar code to verify that he has arrived at the correct location. If he is then directed to pick up a pallet, he may then be required to scan a bar code on the pallet load to identify the load to the application software. A subsequent instruction to deposit the load at a particular location would typically be followed by a bar code scan identifying the deposit location to validate task compliance. Each of these scanning activities requires human intervention or other additional activity that can reduce overall process efficiency. Thus, these processes can be improved if the above data collection elements could be more seamlessly integrated into existing warehouse activities.

The use of radio frequency identification (RFID) technology presents great promise for automating the data collection process. A RFID system typically uses a RFID tag reader to query a RFID tag attached to an object. The RFID tag provides certain information associated with the tagged object.

Prior attempts to effectively implement RFID technology in a warehouse environment have typically failed to fully take into account the aspects mentioned above. For example, the use of RFID "portals" at dock doors in warehouses is typically intended to deliver identification of the load passing through the portal and to designate the location (dock door) identification through the reader's network address. However, this is seldom synchronized with lift operator instructions and application instructions to the operator. Also, the attractive characteristic of RFID as a solution approach is that it can be automated easily and does not require "line of sight" to identify items or locations. RFID systems can, and typically do, read multiple tags; but this often results in extraneous data, which fails to deliver discrete, precise data as required by the application. Thus, the use of RFID systems in warehouse inventory control presents a unique set of problems that have to be resolved to ensure efficient operation of the RFID system.

To be successful for use in a warehouse inventory control, the RFID-based solution should address the first and second aspects above. A key to the first aspect will be that the RFID implementation becomes inherently part of the synchronized activities of the lift operation itself. A key to the second aspect will be that the RFID implementation collects precisely the data expected and required at each step of the lift operation.

With specific reference to warehouse inventory control, the RFID system has to efficiently operate in a harsh operating environment that is typical of a warehouse. RFID tag readers are installed at various locations in the warehouse. Some of these locations are stationary mounting locations, such as that of a RFID tag reader installed on a post located adjacent to a conveyor belt. Other locations are mobile mounting locations, such as that of a RFID tag reader installed on a forklift. One particular function of the RFID tag reader mounted on the forklift is to communicate with RFID tags attached to various objects transported by the forklift.

Mounting the RFID tag reader upon the forklift involves several operational as well as logistical considerations. Consequently, prior to installation of the RFID tag reader, an acceptable mounting location has to be identified such that installation and operation of the RFID tag reader will not interfere with, nor be affected by, the operation of the forklift. Particularly, antennas for communicating with RFID tags should be mounted in a manner that addresses multiple factors.

For example, in some instances, a limited signal strength is required to prevent reading of undesired adjacent RFID tags. Thus, there may be a need to mount antennas for the RFID reader at the front area of the forklift. Furthermore, signal strength requirements may vary for particular applications or types of inventory packaging. Antennas should be located in a manner to improve probability of a correct tag read for numerous inventory types and power requirements.

Another factor is the rugged environment of warehouse operations and mobile material handling equipment. An antenna must have either an adequate structure or secured location to withstand this rugged environment. However, the ruggedized antenna structure should still accommodate typical forklift operations and of standard-size pallets. In some applications it may be preferable to retrofit existing forklift equipment with RFID capable equipment or to provide other cost-effective means of incorporating RFID.

RFID tag alignment can present another factor. When RFID tags are improperly aligned or partially obscured, an interrogating antenna may not be able to read the RFID tag. Thus, to improve tag read rates, there may be a need for multiple antennas to project signals from different positions relative to tags on the pallet. Depending on the interrogating antenna and tag locations, improved read rates may also be possible through the use of particularly polarized signal patterns. In some environments forklifts incorporate double-length (or longer) tines for carrying two (or more) sets of pallets. It would be desirable to automatically and effectively read both sets of pallets and to distinguish between the two sets.

Today, commercial RFID technology operates at ultra-high frequencies (UHF) or microwave frequencies using backscatter coupling techniques. Antenna systems that can support these frequencies, while meeting the above needs are required.

SUMMARY OF THE INVENTION

The present invention provides a tine-mounted antenna for reading RFID tags in a warehouse environment using RFID technology operating at ultra-high frequencies (UHF) or microwave frequencies and backscatter coupling techniques. At least one ruggedized antenna is mounted on the tine or fork (or other base-level platform) of a lift truck (e.g., a forklift). The antenna can be configured to read RFID tags on pallets that are loaded on the lift truck and communicate the tag information to a warehouse management system.

The tine-mounted antenna may incorporate one of several designs that allow for transmission of generally upward-looking RFID signals. Design selection may be driven in part by the dimensions allowed for the forklift tines in a given warehouse environment. In the present invention, the antenna's structure and location on the forklift tines permit use of low-level RF power, which helps to ensure accurate reading of RFID tags on the pallets being loaded without reading adjacent or spurious tags. Multiple antennas may be mounted on a single tine to provide required coverage for double-length tines.

BRIEF DESCRIPTION OF FIGURES

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the particular embodiments of the present invention, examples of which are illustrated in the accompanying drawings.

Figure 1:
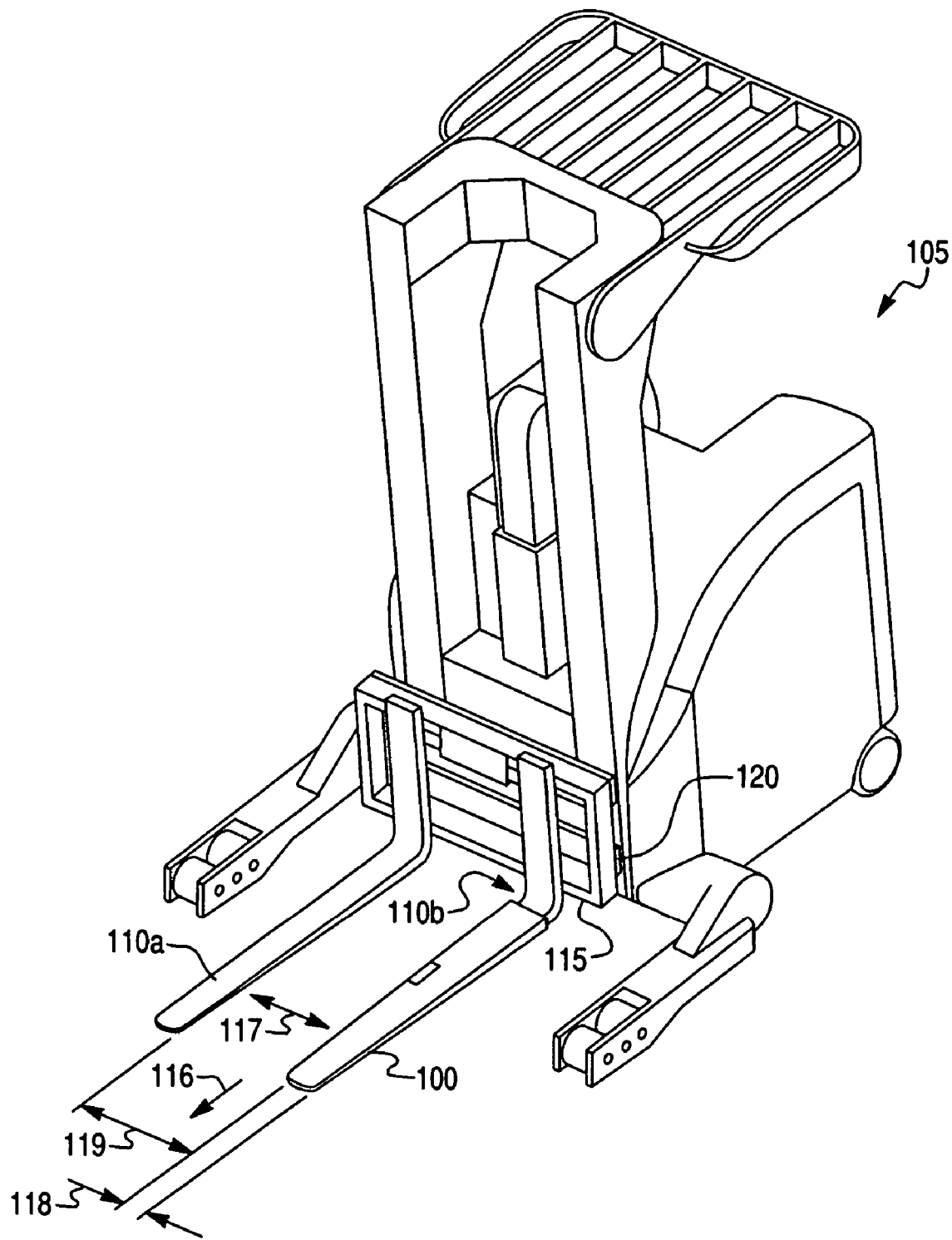
FIG. 1 provides a sketch of a lift truck with antennas mounted on the tines.

FIG. 1 shows a forklift 105 for use in accordance with embodiments of the present invention. Forklift 105 is used here merely for purposes of illustration and it will be understood that in various embodiments the invention may be used on many different forklift configurations. Forklift 105 has a pair of tines 110a and 110b that are used to lift a load (such as, for example, a loaded pallet) for transporting the load from one location to another. The term "tine" may be alternatively referred to as a "fork." In the embodiment of FIG. 1, tine 110b is fitted with an antenna system 100 mounted on the forklift tine according to one embodiment of the invention. Other embodiments may have an antenna system mounted on both tines 110a, 110b. Typically, an operator drives forklift 105 in the direction indicated by arrow 116 and inserts tines 10a and 110b under the load before raising tines 110a and 110b for transporting the load. Sometimes during this operation, tines 110a and 110b may not be located at an appropriate point below the load. Consequently, the operator has to drive back and forth to reposition forklift 105. However, this back and forth driving can be eliminated by using an additional fixture 115, referred to in the art as a "sideshifter," which provides bilateral movement in the direction indicated by bi-directional arrow 117. The sideshifter allows the operator to reposition tines 110a and 110b laterally without having to travel back and forth to do so.

An exemplary sideshifter 115 is shown in FIG. 1. Sideshifter 115 is typically mounted on a mounting frame that for purposes of description is referred to herein as a carriage 120. Sideshifter 115 is slideably mounted on an upper horizontal lip of carriage 120 and can be moved sideways, by an operator of forklift 105. The sideways movement is indicated by arrow 117.

Similar to carriage 120, sideshifter 115 has an upper horizontal lip upon which is installed the pair of tines 110a and 110b. Each pair of tines 110a and 110b has an inverted J-shaped part located on the backside of the vertical part of the tine. Installation is typically carried out by an installer who manually engages the inverted J-shaped part of one of the two tines with the upper horizontal lip at one end thereof of sideshifter 115. The installer then manually moves the tine to a suitable position along the length of the upper horizontal lip. The other tine is then installed from the other end of sideshifter 115 in a similar manner and moved to an appropriate position on the sideshifter such that there is a suitable spacing between the two tines.

Tines 110a, 110b may be interchangeably mounted on either sideshifter 115 or on carriage 120. In the exemplary embodiment shown in FIG. 1, tines 10a, 10b are shown mounted on the front surface of sideshifter 115. It will be understood that the description provided below is equally pertinent to installing 110a, 110b on carriage 120.

Figure 2A:
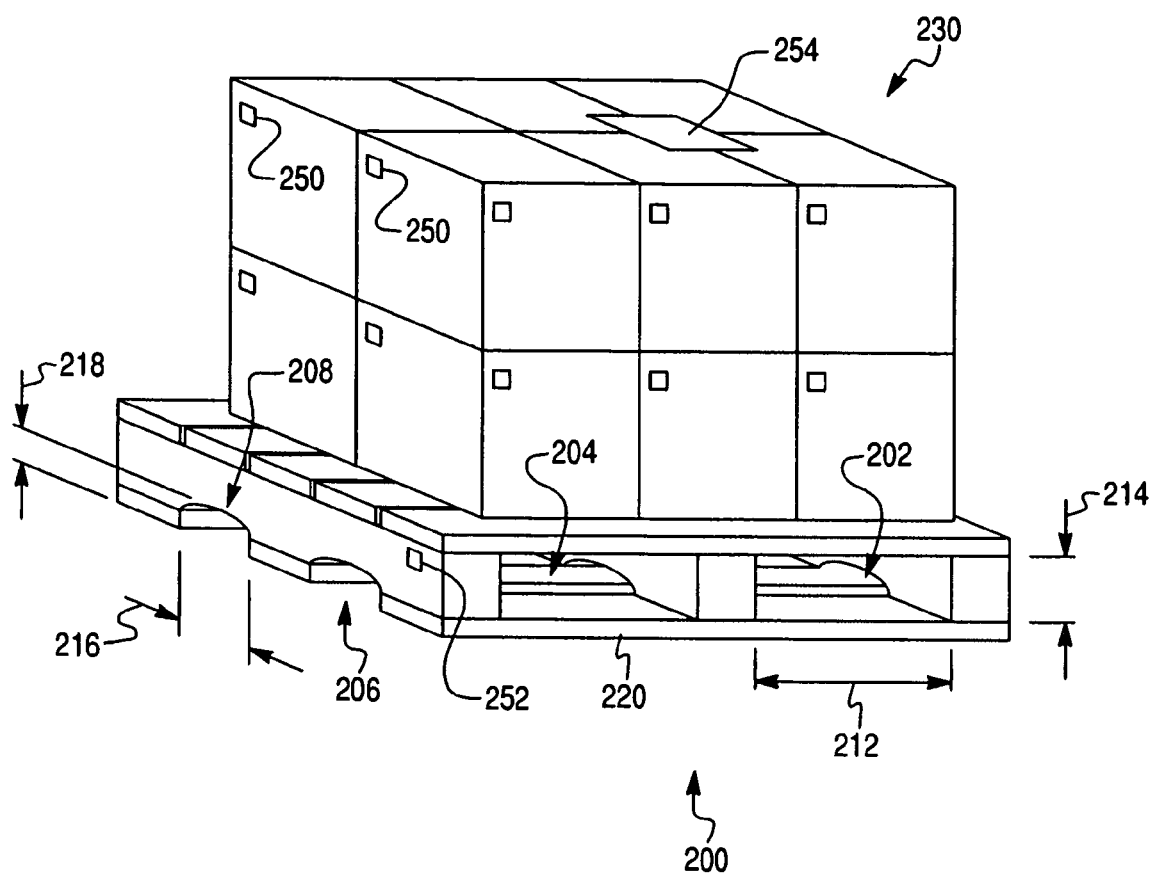
FIG. 2A provides a schematic of a pallet loaded with tagged inventory according to one embodiment of the invention.

FIG. 2A shows a typical pallet that is used to support and transport loads of inventory containers 230 with a forklift. The pallet in FIG. 2A has a front entry way with two primary openings 202 and 204 and a rear entry way with two primary openings (not shown). The front and rear openings are typically used to receive the tines of a forklift. Other openings on the left side 206, 208 and the right side (not shown) are typically used for a hand pallet truck (or other inventory moving equipment having wheel-supported forks) to prevent having to force pallet fork wheels over the bottom slat 220 at the primary openings 202, 204, for example. As can be seen in FIG. 2A, the width 212 and height 214 of the primary openings 202, 204 are larger than the width 216 and height 218 of the side openings. The primary openings are, thus, typically preferred for use with a forklift. However, with a greater amount of operator care, the side opening may also be used with a forklift. The pallet of FIG. 2A may be referred to as a "two-way entry pallet," referring to the front and rear primary entry ways. Other pallet designs, such as a four-way entry pallet provide openings in the front, rear and sides that are all suitable for typical forklift use. The size and spacing of the primary openings 202, 204 (and, in some cases, the side openings 206, 208) may prove to be a limiting factor in potential modifications to typical forklift tines. Specific pallet dimensions vary with particular applications, and in many cases are customized for specific purposes. For illustrative purposes only, the width 212 of the primary openings 202, 204 for a pallet may be between about 10-12 in., while the height 214 of the primary openings 202, 204 may be about 3-4 in.

Pallet 200 and/or inventory containers 230 may include radio frequency identification tags ("RFID") to identify inventory contents. A variety of pallet tags may be used to provide redundancy for an inventory control system. For example, as shown in FIG. 2A, RFID tags 250 are included on each of the packaged inventory containers 230. Another RFID tag 252 may be included on the actual pallet 200. Additional pallet tags (not shown) may be embedded in the actual pallet or on a non-visible surface of the pallet 200. Also, a unit load tag (or serialized shipping container code tag) 254 may be provided. The unit load tag 254 is typically applied over a group of inventory containers 230 that may be secured together (via shrink-wrap, for example). By associating (in, for example, a database) the inventory container tags 250, pallet tags 252, and unit load tags 254 when the pallet 200 is loaded, the entire pallet contents can be recognized at a later time by reading any single one of the tags 250, 252, 254.

Figure 2B:
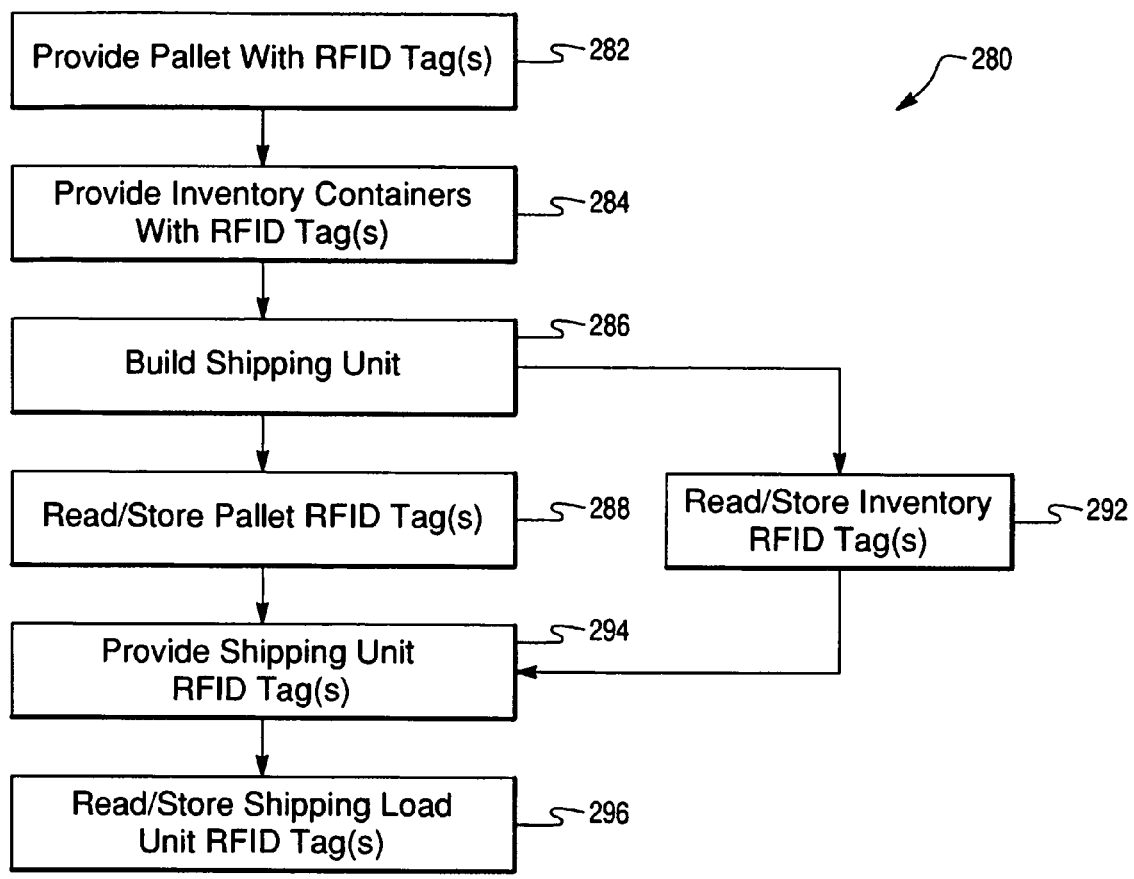
FIG. 2B provides a flow chart of a palletization process according to one embodiment of the invention.

The tags 250, 252, 254 may be grouped or associated during, for example, the palletizing process. As an example, referring to FIG. 2B, the tags may be grouped during building of the shipping unit according to the process 280. In step 282, a pallet with one or more embedded RFID tags (e.g., pallet tag 252 of FIG. 2A) is provided for use with a palletizer (or a similar machine that loads inventory onto pallets and (optionally) wraps the full pallets in plastic for shipping). The palletizer may be equipped with an RFID tag reader operatively connected to a computer. In step 284, RFID tags (e.g., container tags 250 of FIG. 2A) are also affixed to individual inventory containers so that each container is individually associated with a RFID tag that indicates the contents of each container. In step 286 the palletizer receives instructions to build, and begins building a shipping unit of inventory on the pallet. The shipping unit may include any grouping of individual inventory containers that have been labeled (as in step 284) with RFID tags. In step 288, the RFID tag on a pallet is read by the RFID reader on the palletizer and stored in memory on the computer. In step 292—which may occur prior to, simultaneously with or after step 288—the RFID tag for each container is read by the RFID reader on the palletizer and the result of each tag read is stored in the computer memory to associate each inventory RFID tag with the pallet RFID tag. After the pallet is loaded with the inventory, in step 294, the loaded pallet may be physically secured as a unit (using shrink wrap, for example) and labeled with another RFID tag (e.g. unit load tag 254 of FIG. 2A) identifying the unit load as a whole. In step 296, the unit load RFID tag is read and stored in the computer memory to be associated with the pallet and inventory contents. The association of pallet, inventory containers, and unit load tags are stored in a warehouse management system or other inventory control system.

Using, for example, the process above, each pallet and loaded inventory is associated with an individual shipping unit. By communicating with the inventory management system, a correct read of any single RFID tag from the shipping unit can allow identification of the entire unit in subsequent operational stages. As will be shown in more detail with respect to the subsequent figures, embodiments of the present invention provide antennas on one or more of the forklift tines 110a, 110b that interrogate the RFID tags with backscatter coupling techniques.

Referring collectively to FIGS. 1 and 2A, when the antenna system 100 is placed within range of the RFID tags 250, 252, 254 (e.g., when the forklift tines 10a, 10b are positioned in the primary openings 202, 204 of the pallet 200), the antenna system 100 enables communication between the RFID tags 250, 252, 254 and reader electronics (not shown) located in the carriage area 120 of the forklift 105. While FIG. 1 shows the antenna system 100 oriented toward the inside of the tine 110b, antenna system 100 may be configured to mount on either side of the tine 110b and the locations are not limited by the embodiments shown herein. The antenna system 100 may be mounted on a single tine (as shown in FIG. 1) or on both tines of the forklift. Use of a separate antenna system 100 on each of the tines 110a and 110b provides redundancy and diversity that may increase the probability of a successful RFID tag read.

The antenna system 100 may operate at a variety of frequencies such as, for example, ultra-high frequencies ("UHF") in the range of 800-1000 MHz or microwave frequencies in the range of 2.4-2.5 GHz. The short wavelengths of these frequency ranges facilitate the construction of antennas with smaller dimensions and greater efficiency than would be feasible using lower frequency ranges (e.g., below 30 MHz). In some embodiments, the power level for the antenna system 100 may be adjusted to provide the ideal signal range to read desired pallet tags without reading unwanted tags in a nearby vicinity. More particularly, the tine-mounted antenna 100 may emit a low-power signal that allows as few as one of the tags 250, 252, 254 to be read, avoiding spurious tag reads from adjacent pallets or the like. Some factors that contribute to a correct tag read include the location of the antenna, the primary direction on the antenna signal, and the signal pattern. Various embodiments that can satisfactorily address these factors are disclosed herein.

As described in more detail below, the inclusion of the tine-mounted antenna system 100 of FIG. 1 may increase the functional width 118 of the standard tine 110b by about 1-1.5 in., while the height dimension may increase by about 0.5 in. The increased dimensions will generally not prove limiting for most typical pallet applications. While the clearance of the tines 110a, 110b in the pallet openings may be reduced, minor adjustment of the tine 110a, 110b spacing 119 and use of side shifter 115 may eliminate any such concerns.

Figure 3A:
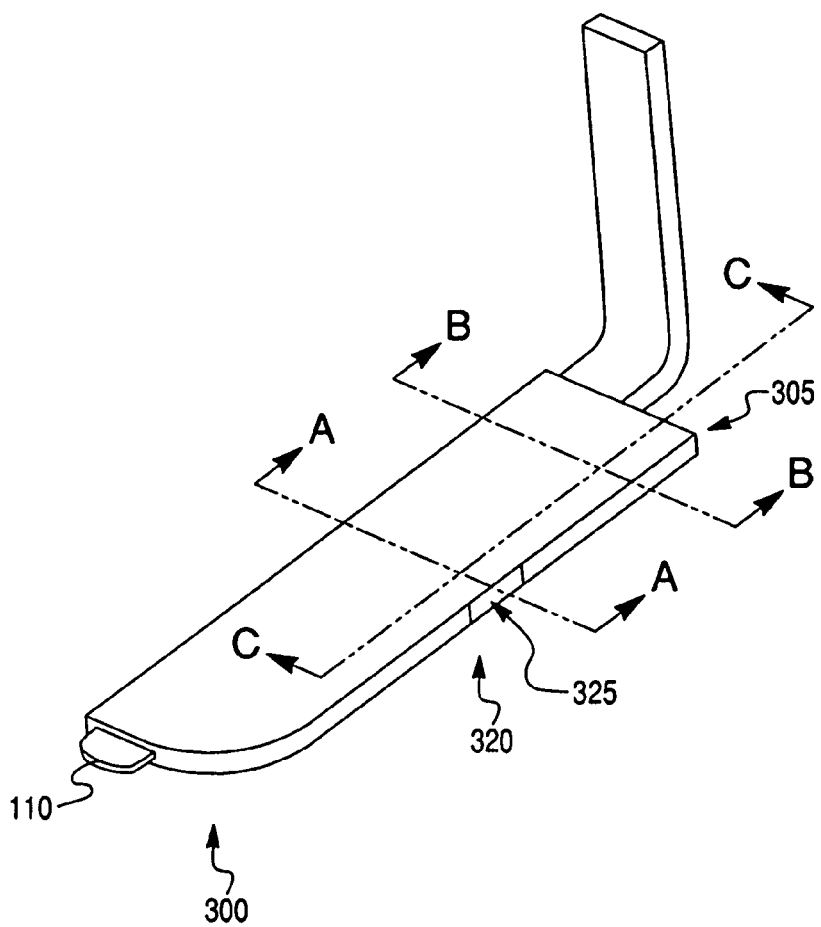
FIG. 3A provides a perspective view of an open-ended waveguide antenna system mounted on a forklift tine according to one embodiment of the invention.

Referring now to FIG. 3A, the figure shows a perspective view of an open-ended waveguide antenna system mounted on a forklift tine according to one embodiment of the invention. The antenna system 300 includes a support structure 305 that slides over the horizontal portion of tine 110 to secure the antenna components to the tine. The support structure 305 may be made of, for example, a conductive material such as quarter-inch steel or another rugged material. Other embodiments may use a durable non-conductive material. The support structure includes a cut-out 320, enclosed by a protective cover 325, in which antenna components are housed. Details of the support structure and enclosed antenna components are discussed in more detail with respect to FIGS. 3B-3D.

Figure 3B:
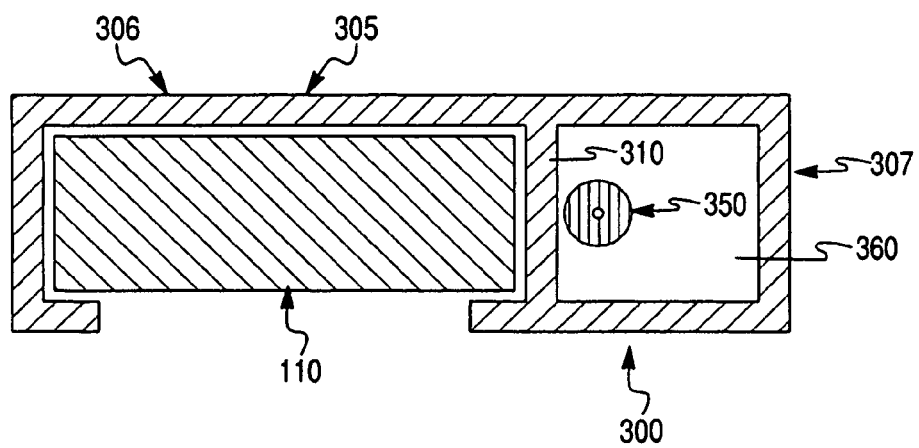
FIG. 3B provides a cross-section along B-B of the tine antenna of FIG. 3A.

FIG. 3B provides a cross-section along B-B of the tine antenna system 300 of FIG. 3A. Support structure 305 is divided by a wall 310 into two longitudinal sections, a mounting section 306 and a component section 307. While the mounting section 306 and the component section 307 are shown side-by-side in FIG. 3B, other orientations, such as the component section being above or below the mounting section, are contemplated. The mounting section 306 is configured to slide over the forklift tine 110. The mounting section 306 serves as a mounting bracket to secure the open-ended antenna system 300 to the tine 110. The mounting section 306 may be further secured to the tine 110 by welding, bolting or other mechanical means. While the embodiment in FIG. 3B shows the mounting section 306 wrapping around the bottom of the tine 110 to at least partially surround all four sides of the tine 110, other embodiments may simply surround the tine on three sides to allow for easier installation. Optionally, a bracket—such as, for example, brackets used on conventional forklift tine extensions—may be included to secure the mounting section to the vertical part of the tine 110. The component section 307 at the point of cross section B-B in FIG. 3B provides a protective channel 360 for a coaxial cable 350 or other mechanism for providing RF energy from a power source (930, FIG. 9)—located on the carriage or elsewhere on the forklift—to other antenna components for antenna system 300. While a coaxial cable 350 is shown, other means may be used to provide RF energy, such as, for example a microstrip line or other suitable RF transmission line structure. The cable 350 may be secured in the channel 360 by optional brackets or adhesives (not shown). In an alternate embodiment, the shape of the channel may be limited to a smaller dimension in order to snugly hold cable 350.

Figure 3C:
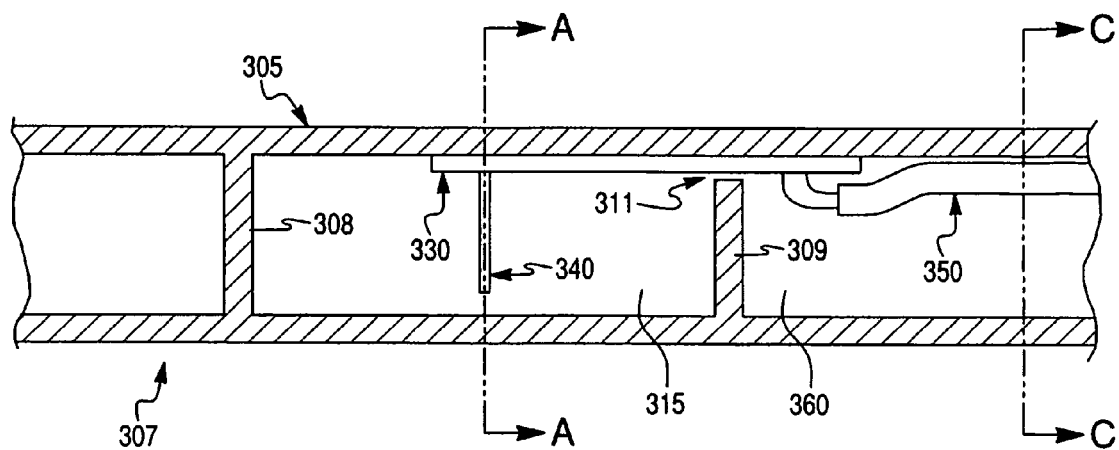
FIG. 3C provides a cross-section along C-C of the tine antenna of FIG. 3A.

FIG. 3C provides a longitudinal cross-section along the line C-C of the tine antenna system 300 of FIG. 3A. A side view of the internal components of antenna system 300 are shown within component section 307. Walls 308, 309 section off a portion of the component section to form a smaller cavity 315, that aligns with the cut-out 320 shown in FIG. 3A. The coaxial cable 350, which extends from the carriage area of the forklift, may be coupled to a feed printed circuit board 330 in a conventional manner. The printed circuit board 330 extends from the channel 360 through an insulated gap 311 in wall 309 and into the cavity 315. The printed circuit board 330 may be mounted to the component section 307 by mechanical means, such as adhesives, screws, or brackets. A feed element 340 is shown extending from the printed circuit board 330 into the cavity 315 to project RF energy that will be radiated from cavity 315 through the cut-out 320 (shown in FIG. 3A). The printed circuit board 330 provides one example of an effective transition structure to feed RF energy from the coaxial cable 350 to the radiating element. However, other transition structures may also be used, such as, for example, a conductive strip simply sandwiched between dielectric layers. Generally, any power distribution network that meets the structural requirements of the antenna system 300 can be used. The support structure 305 and cavity 315 of antenna system 300 form a radiating element that has a uniform voltage at a low frequency (e.g., less than 1 MHz) across the waveguide radiating element. Thus, insulating layers or other grounding means are unnecessary.

Figure 3D:
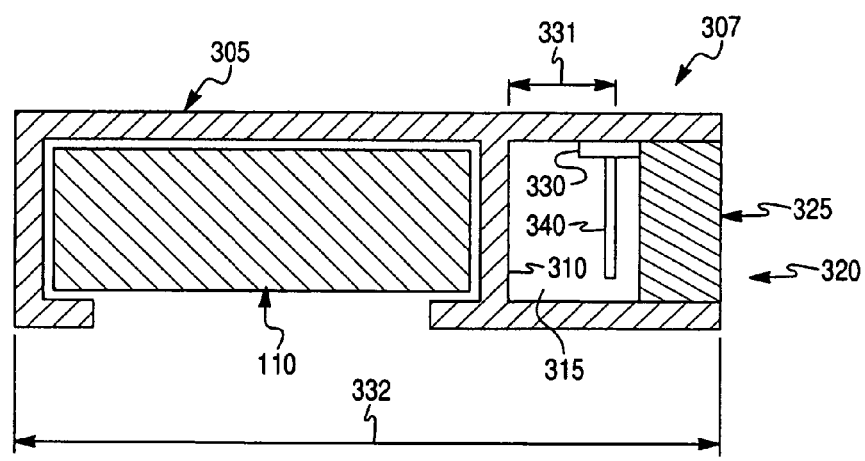
FIG. 3D provides a cross-section along A-A of the tine antenna of FIG. 3A.

FIG. 3D provides a cross-section view along line A-A of the tine antenna system 300 of FIG. 3A. Support structure 305 is shown with the mounting section 306 engaged around the tine 110. The component section 307 shows cavity 315 with the printed circuit board 330 and the feed element 340 therein. The protective cover 325 inserted into cut-out 320 encloses the cavity 315. The protective cover may be attached by a variety of methods including adhesives, screws, compression fit, tongue-in-groove, or other suitable means. In FIG. 3D, the cavity 315 is shown with air or other gas inside cavity 315. However, in other embodiments, the cavity 315 may also be filled with a dielectric material. The dielectric material may, for example, fill the entire cavity 315, thus eliminating the need for a separate cover 325. Cut-out 320 is shown in FIG. 3D on the side of component section 307; but in other embodiments the cut-out may be on the top or bottom of component section 307. The cover 325 is included to prevent damage to the antenna components 330, 340 and to prevent collection of debris in cavity 315. The cover 325 may be made from any other abrasion-resistant and impact-resistant material that allows for RF transmissions. Some exemplary (and non-limiting) materials include Delrin®, Lexan®, ultra-high molecular-weight polyethylene (MWPE), other polycarbonates, and/or fiberglass-filled epoxy.

Still referring to FIG. 3D, the optimal location of the feed element 340 in relation to the wall 310 is determined by the frequency of the antenna system. Generally, the feed element 340 in FIG. 3D is located a distance 331 of about one-quarter wavelength from wall 310. Thus, the overall width 332 of the support structure 305 may also vary, depending upon the frequencies required for particular operating environments.

Figure 4A:
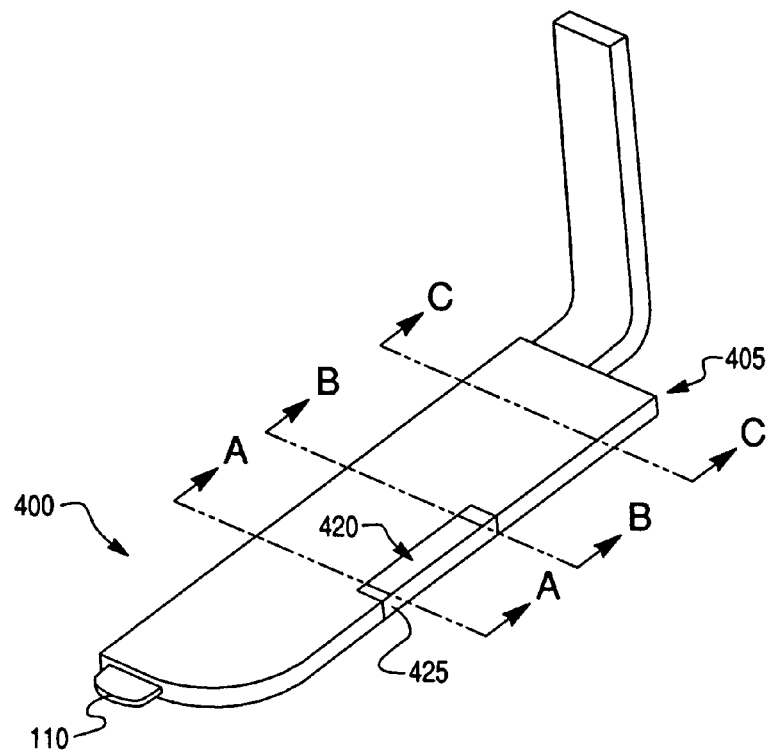
FIG. 4A provides a perspective view of an inverted "F" antenna system mounted on a forklift tine according to one embodiment of the invention.

FIG. 4A provides a perspective view of an inverted "F" antenna system mounted on a forklift tine according to one embodiment of the invention. The antenna system 400 includes a support structure 405 that slides over the horizontal portion of a tine 10 to secure the antenna components to the tine. The support structure 405 may be made of, for example, quarter-inch (¼") thickness steel or another rugged material. In some embodiments a conductive material, such as steel, may be used. Other embodiments may use a durable non-conductive material. The support structure includes an opening or aperture 420, that may be enclosed by a protective cover 425, in which antenna components are housed. Details of the support structure and enclosed antenna components are discussed in more detail with respect to FIGS. 4B-4F.

Figure 4C:
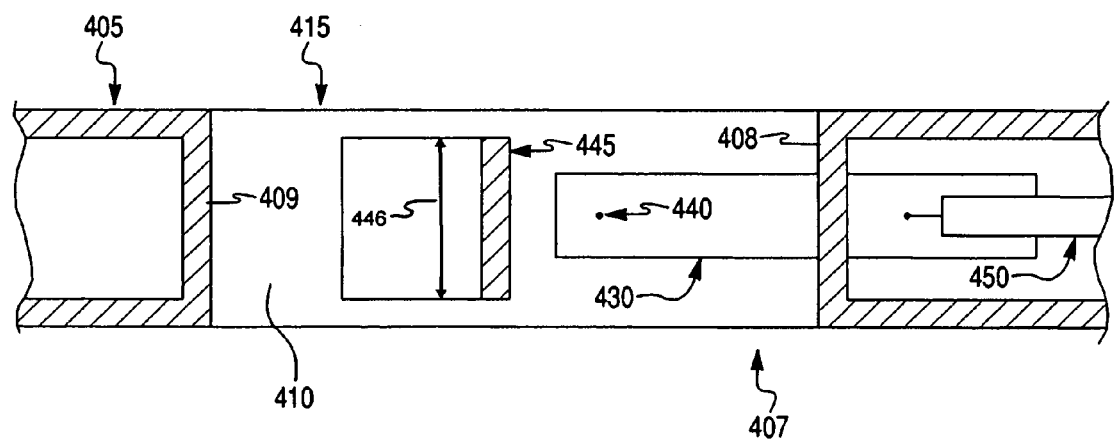
FIG. 4C provides a cross-section along D-D of the tine antenna of FIG. 4B.
Figure 4B:
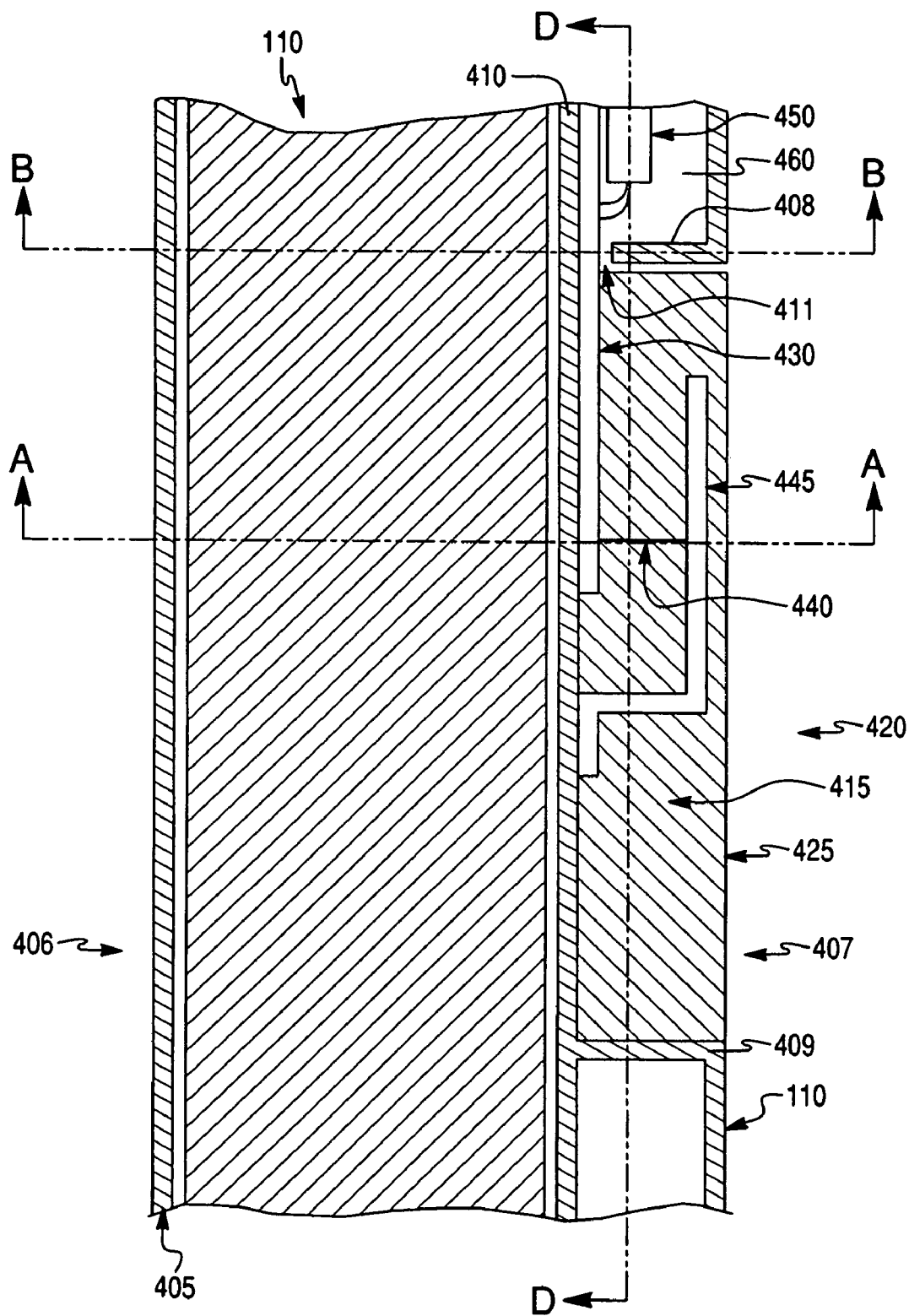
FIG. 4B provides a top view of the inverted "F" antenna system of FIG. 4A, shown with the top layer removed.

FIG. 4B provides a top view of the inverted "F" antenna system of FIG. 4A, shown with the top layer of support structure 405 removed. Similar to the embodiment of FIGS. 3A-E, support structure 405 is divided by a wall 410 into two longitudinal sections, a mounting section 406 and a component section 407. The mounting section 406 may function essentially the same as that of mounting section 306, described with respect to FIGS. 3A-D. The component section 407 in FIG. 4B provides a protective channel 460 for a coaxial cable 450 or other mechanism that provides RF energy from a power source (e.g., 930, FIG. 9) to other antenna components for antenna system 400. As discussed with the previous embodiments, energy distribution is not limited to use of the coaxial cable 450. The cable 450 may be secured in the channel 460 by optional brackets or adhesives (not shown), or simply by the shape of the channel.

Walls 408, 409 section off a portion of the component section to form a recess 415, that aligns with the opening 420 (as shown in FIG. 4A). The coaxial cable 450, which extends from the carriage area of the forklift, may be coupled to a printed circuit board 430 (or equivalent) in a conventional manner. The printed circuit board 430 includes a microstrip feed line (not shown) and extends from the channel 460 through an insulated gap 411 in wall 408 and into the recess 415. The printed circuit board 430 may be mounted to the component section 407 in conventional ways described above with respect to FIG. 3A-E. A radiating element 445 in the form of an inverted-F is mounted to the wall 410 within the recess 415. The shape of the inverted-F radiating element 445 is exemplary and not limiting. Other F-shaped radiating elements known in the art are also contemplated for use with the present invention. The radiating element 445 may be secured to the wall 410 by welding, bolting or other mechanical means. A feed element 440 is coupled to the microstrip feed line (not shown) and is shown extending from the printed circuit board 430 across a portion of the cavity 415 to the radiating element 445 to project RF energy. As is generally understood in the art, the radiating element 445 is spaced sufficiently from the walls 408, 409 to limit impact to the radiated signal. The support structure 405 and radiating element 445 of antenna system 400 may have a uniform voltage at a low frequency (e.g., less than 1 MHz) across the radiating element. Thus, insulating layers or other grounding means are unnecessary in this embodiment.

Still referring to FIG. 4B, the protective cover 425 is inserted into opening 420 to enclose the recess 415. The protective cover 425 may be attached by a variety of methods including adhesives, screws, compression fit, tongue-in-groove, or other suitable means. As shown in FIG. 4B, the cover 425 comprised of a dielectric material is actually poured in to fill the entire recess 415 with a dielectric material surrounding the radiating element 445 inside recess 415. However, in other embodiments, the recess 415 may also be filled with air or other gas. In other embodiments, a discrete dielectric material may, for example, fill the recess 415, and a separate cover could be used. The cover 425 is included to prevent damage to the antenna components 430, 440, 445 and to prevent collection of debris in cavity or aperture 420. The cover 425 may be made from any other abrasion-resistant and impact-resistant material that allows for RF transmissions. Some exemplary (and non-limiting) materials are listed above with respect to FIG. 3D.

FIG. 4C is a cross-section along D-D of the tine antenna of FIG. 4B with the cover removed to expose some of the internal components of antenna system 400 within component section 407. The height 446 of the radiating element 445 may use up to the available height of the wall 410. Thus, the radiating element 445 is configured to have a vertical dimension (as installed against tine 110) that is no thicker that that of that of tine 110 at the point of attachment of the radiating element 445.

Figure 4D:
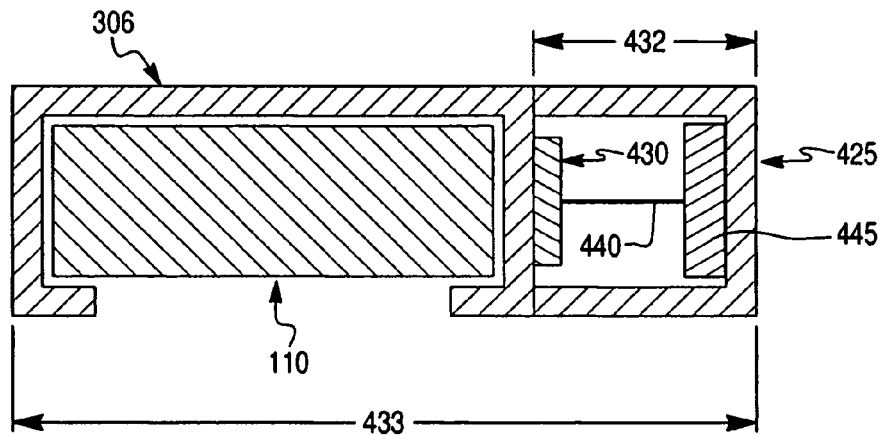
FIG. 4D provides a cross-section along A-A of the tine antenna of FIG. 4A.

FIG. 4D provides a cross-section along A-A of the tine antenna of FIG. 4A. The length of the feed element 440 from the printed circuit board 430 to the radiating element 445 is influenced by the frequency of the antenna system. Thus, the overall width 432 of the component section 407 specifically, and the width 433 of the support structure 405 generally, may be varied depending upon the frequencies required for particular operating environments.

Figure 4E:
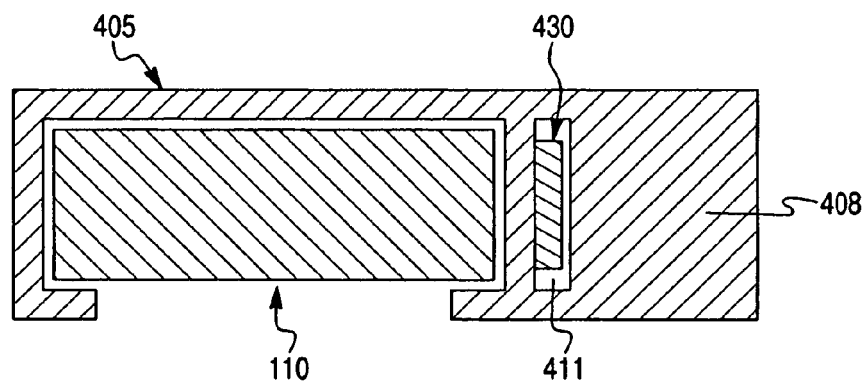
FIG. 4E provides a cross-section along B-B of the tine antenna of FIG. 4A.
Figure 4F:
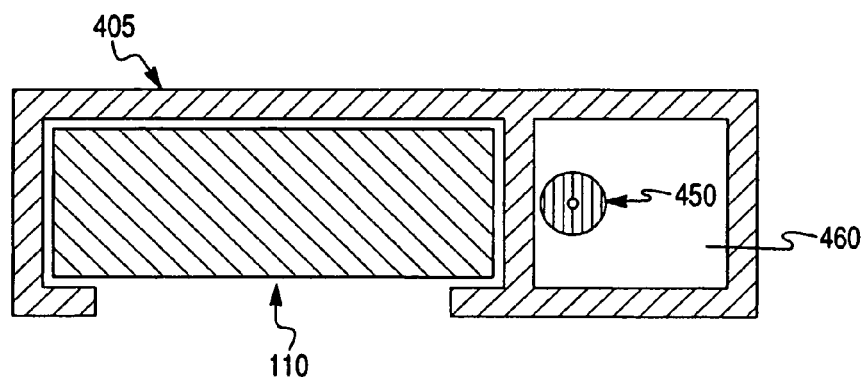
FIG. 4F provides a cross-section along C-C of the tine antenna of FIG. 4A.

FIGS. 4E and 4F provide various cross sectional views of the embodiment of FIG. 4A. FIG. 4E provides a cross-section along B-B of the tine antenna of FIG. 4A. The gap 411 in wall 408 is shown that allows the printed circuit board 430 to pass from the channel 460 (not visible, but behind wall 408) into recess 415 (in front of wall 408). FIG. 4F provides a cross-section along C-C of the tine antenna of FIG. 4A. The channel 460 for coaxial cable 450 is shown.

Figure 5:
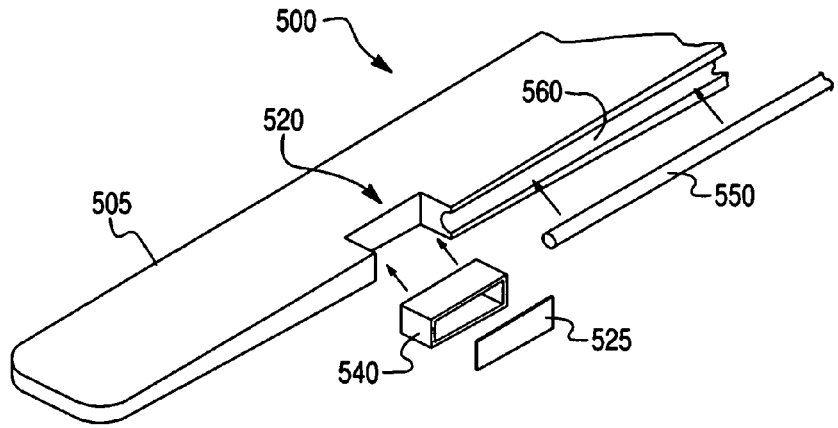
FIG. 5 provides a perspective view of an integrated antenna system for a forklift tine according to one embodiment of the invention.

FIG. 5 provides a perspective view of an integrated antenna system 500 for a forklift tine according to one embodiment of the invention. The embodiment of FIG. 5 provides an alternative to the use of a separate structure to mount an antenna system on a tine. The support structure and the horizontal structure of a tine may be formed as a single unit 505 (of steel or other strong material). In such an embodiment, the mounting section of the steel frame (e.g., 306 of FIG. 3) could be eliminated, reducing the overall height and width of the antenna system. Also, a groove 560 in one of the top, bottom or side surfaces of the tine may be provided as a path for a coaxial cable 550. The coaxial cable 550 could be secured in the groove 560 with an adhesive, compression fit, a cover, or other mechanical means. A cavity or notch 520 in the tine/support structure could be machined to hold the other antenna components which may be grouped in a housing 540. The housing 540 may be mounted in the notch by any conventional means known in the art, including screws, compression fit, tongue-in-groove, adhesives or combinations thereof. The components in the housing 540 may be essentially similar to those described above with respect to FIGS. 3A-D and 4A-F. In short, the housing 540 may serve to hold any type of RFID antenna structure that can structurally fit within the dimensions of the tine. The housing 540 may be made of steel (or other conductive material) to serve as a radiating and/or grounding element. Alternatively, a separate radiating element may be included in the housing. A protective cover 525 may be included that is installed over the opening of housing 540 to be essentially flush with the surface of the tine 505 when installed. Cable 550 may extend (through, for example, a hole (not shown) in a sidewall of the housing 540) into the antenna housing, or a transition structure may be used, such as those describe above with respect to FIGS. 3A-D and 4A-F.

Figure 6A:
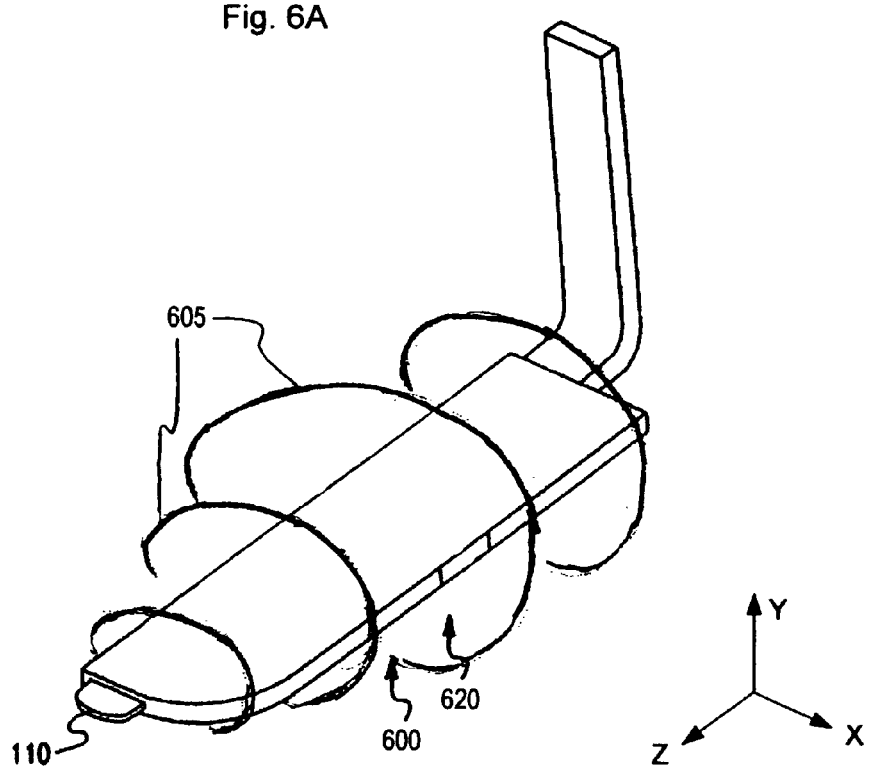
FIGS. 6A and 6B provide views of a typical antenna signal pattern for an open-ended waveguide antenna mounted on a forklift tine.
Figure 6B:
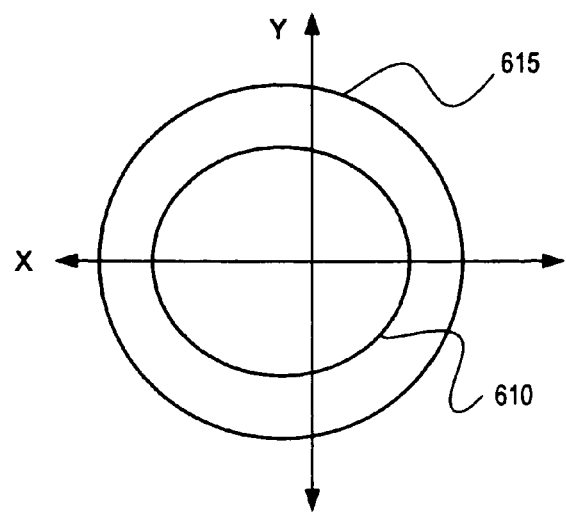

FIGS. 6A and 6B illustrate views of a typical antenna signal pattern for an open-ended waveguide antenna mounted on a forklift tine. FIG. 6A shows an exemplary antenna 600 mounted on a forklift tine 110 along with a Cartesian coordinate system aligned with the z-axis parallel to the tine axis and the x-axis directed cross to the tine axis and aligned with an aperture opening 620. The polarization of this antenna configuration is aligned with the y-axis local to the aperture opening 620 and forms a circulation pattern 605 as depicted in FIG. 6A. FIG. 6B illustrates a polar diagram of the relative amplitude of the field showing a pattern maximum 615 in the general direction of the aperture opening and a reduction in the field magnitude 610 in the -x axis direction.

Figure 7A:
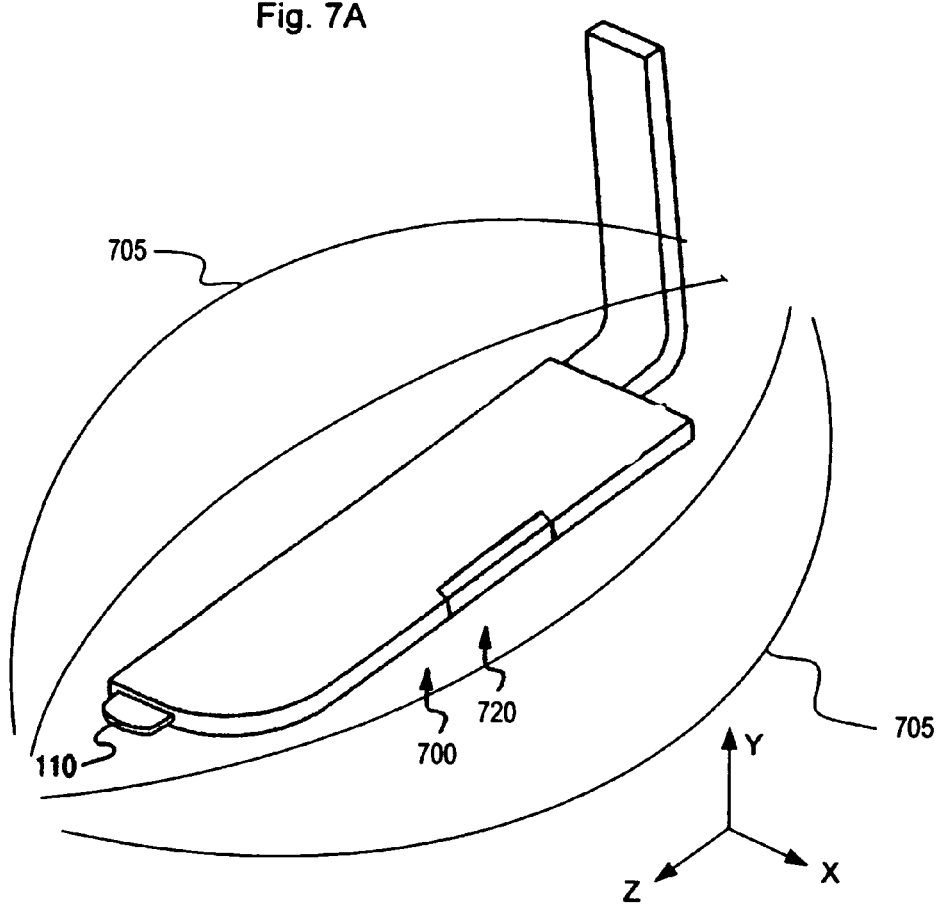
FIGS. 7A and 7B provide views of a typical antenna signal pattern for an inverted F antenna mounted on a forklift tine.
Figure 7B:
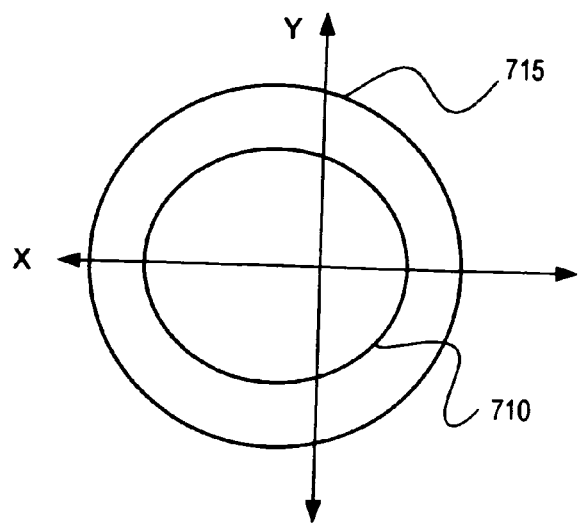

FIGS. 7A and 7B illustrate views of a typical antenna signal pattern for an inverted F antennas mounted on a forklift tine. FIG. 7A shows an exemplary antenna 700 mounted on a forklift tine 110 along with a Cartesian coordinate system aligned with the z-axis parallel to the tine axis and the x-axis directed cross to the tine axis and aligned with an aperture opening 720. The polarization of this antenna configuration is aligned with the z-axis local to the aperture opening and forms a circulation pattern 705 as depicted in FIG. 7A. FIG. 7B illustrates a polar diagram of the relative amplitude of the field showing a pattern maximum 715 in the general direction of the aperture opening and a reduction in the field magnitude 710 in the -x axis direction.

Figure 8A:
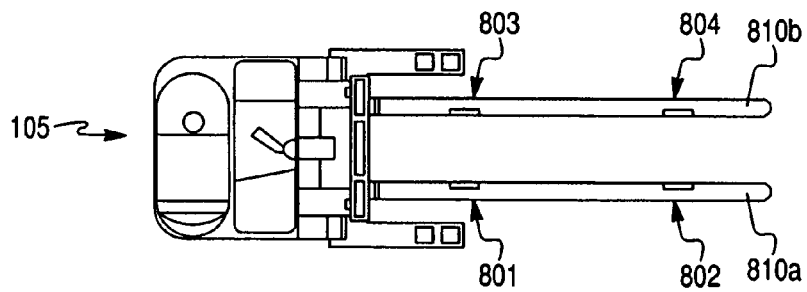
FIG. 8A provides a top view of a forklift with double-length tines having integrated RFID antennas.
Figure 8B:
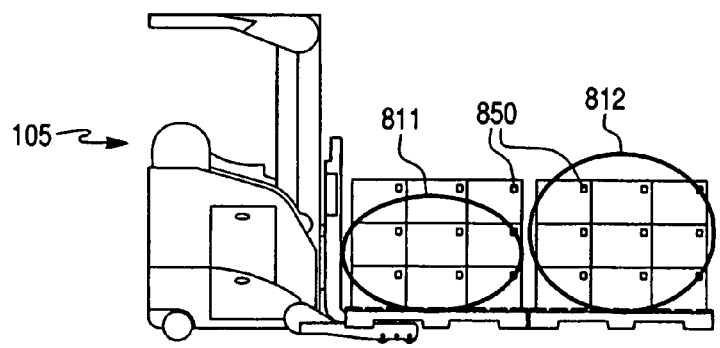
FIG. 8B provides a side view of a forklift with double-length tines having integrated RFID antennas.

FIG. 8A provides a top view schematic of a lift truck 105 with antennas 801, 802 and antennas 803, 804 mounted on double-length tines 810a and 810b, respectively. Each of antennas 801, 802, 803, and 804 may be any one of the antennas for the systems disclosed in FIGS. 3A-E, 4A-F, and 5. Thus, while the antennas 801, 802, 803, and 804 are shown on the inside of each tine 810a and 810b, top-mounted antennas or antennas mounted on other sides are also contemplated. Antennas 801, 802 on tine 810a and antennas 803 and 804 on tine 810b may be positioned symmetrically along the length of each tine, as shown in FIG. 8A, or offset with respect to each other. As shown in FIG. 8B, the antennas can be configured to each project a low-power signal so as to allow reading of only the RFID tags 850 associated with a pallet/inventory above each respective antenna. In the side view of FIG. 8B, representative patterns 811 and 812 from antennas 801 and 802 (not visible), respectively, are shown. The power level of each antenna can be adjusted individually. In some embodiments, the power for each antenna may start very low (or no power) and be increased only to the point of achieving a first tag 850 read to identify the pallet most likely above each respective antenna. (As described above with respect to FIG. 2A-B, a single RFID tag may be representative of an entire pallet's contents.) In other embodiments, the antenna signals 811, 812 may intentionally overlap to increase probability of a successful RFID tag read on, for example, a double-length pallet.

Figure 9:
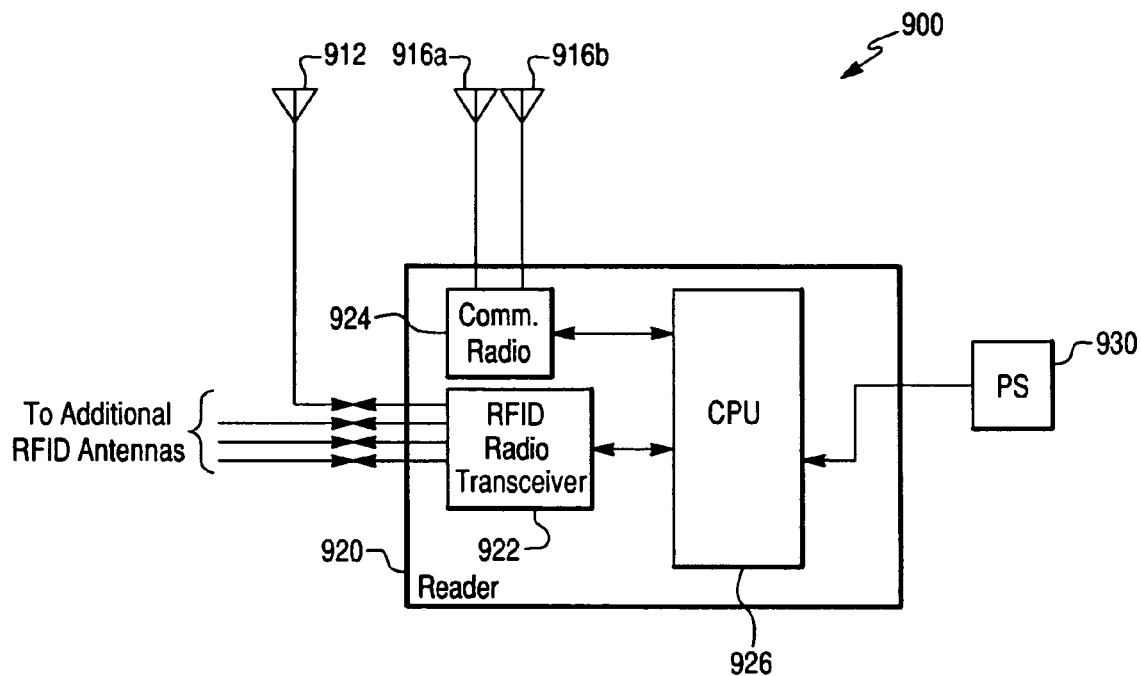
FIG. 9 provides an electrical system block diagram for a forklift-mounted communication system utilizing an antenna system according to embodiments of the present invention.

FIG. 9 provides a system block diagram for a forklift-mounted communication system 900 utilizing an antenna system according to embodiments of the present invention. Ruggedized antenna 912 may be mounted, for example, on the tines of a forklift. The antenna system 900 may also include, for example, wireless network antennas 916a, 916b. Other antenna combinations are also contemplated within the scope of embodiments of the present invention. The RFID antenna 912 is operatively connected to a RFID radio transceiver 922; while the wireless network antennas 916 are operatively connected to a wireless communications radio (e.g., an IEEE standards 802.11 radio) 924. The radio transceiver 922 and communications radio 924 may be housed in or otherwise operatively connected with a central processing unit (CPU) 926 in a RFID reader 920. Signals from the RFID antenna 912 are transmitted through the RFID radio transceiver 922 to the CPU 926. The CPU 926 interprets the RFID signal and transmits information to a warehouse or inventory management system (not shown) via wireless network radio 924 and antennas 916a, 916b. The CPU 926 may also contain a power source 930 for the radio transceiver 922 and communications radio 924 and antennas 912, 916a, 916b. The power level of the RFID antenna 912 and/or reader 920 may be adjusted to suit particular applications. The reader 920 may be located, for example, on the carriage area of a forklift. The power supply 930 from, for example, the forklift battery provides power for the communication system 900.

Figure 10:
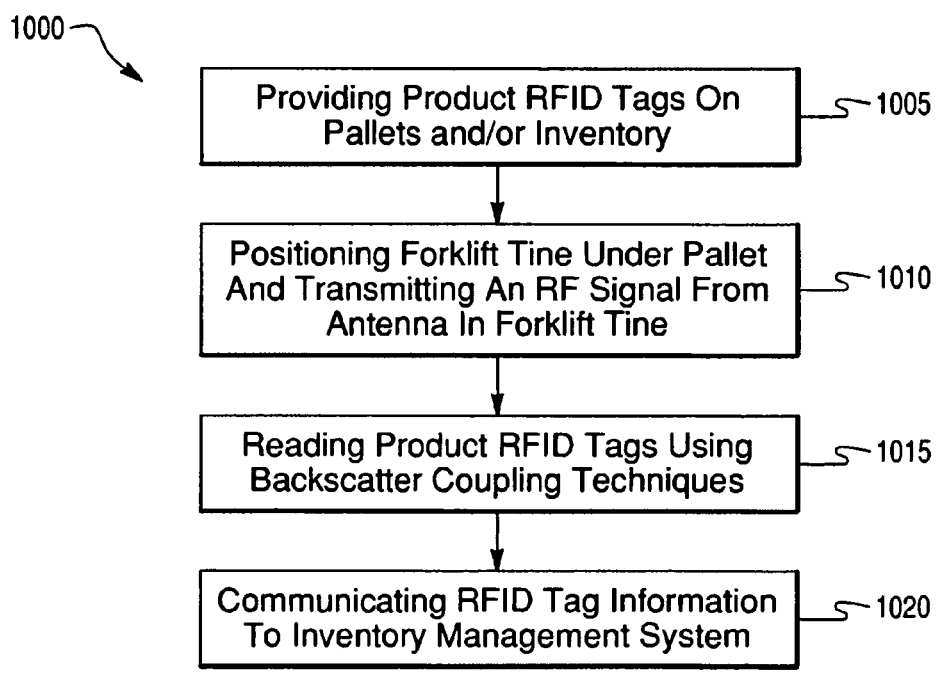
FIG. 10 provides a flow chart of a method of collecting inventory tracking data in a material handling environment using an integrated forklift tine antenna according to an embodiment of the invention.

FIG. 10 provides a flow chart of a method 1000 of collecting inventory tracking data in a material handling environment using an integrated forklift tine antenna according to an embodiment of the invention. The method 1000 includes a step 1005 of providing product RFID tags on one or more pallets and/or the inventory on the pallets. The product RFID tags represent inventory contents. In step 1010, the forklift tine is placed under the pallet and emits a RF signal from one or more antennas in the forklift tine. The RF signal may be transmitted from the forklift tine antenna in a predominantly upward direction. The RF signal may be in the functional range of about 900 MHz (800 to 1000 MHz) or about 2.4 GHz (2.4-2.5 GHz) or even about 5.7-5.8 GHz. In some embodiments, the antenna signal may be circularly polarized and/or dual linearly polarized; while other embodiments may use a linearly polarized signal or a combination of differently polarized signals. Next, in step 1015, the information from the product RFID tags is read using backscatter coupling techniques that use, for example, RF signals rather than magnetic coupling to communicate with the RFID tags. In cases where more than one pallet is being carried and the pallets are next to each another, the forklift tine may be configured so that least one antenna may be located under each pallet. By separately tracking each RF antenna signal, each pallet may be uniquely identified by the RFID reader. Finally, in step 1020, the method 1000 includes the step of communicating the RFID tag information to an inventory management system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. An antenna system for interrogating radio frequency identification (RFID) tags with backscatter coupling techniques, said antenna system suitable for mounting on a tine of a forklift, comprising:
    a support structure adapted for mounting on said tine, said support structure including a mounting section and a component section each extending along at least a portion of said support structure, said mounting section configured to secure said support structure to said tine and said component section including at least one cavity wherein said cavity has a first opening;
    a first antenna mounted in said cavity, said antenna comprising a first radiating element and a first power distribution network;
    a first cover for said radiating element, said first cover mounted to and essentially flush with the component section so as to permit said radiating element to project a first radio frequency signal through said first opening.

2. The antenna system of claim 1, wherein said mounting section and said component section are side-by-side when said support structure is mounted on said tine.

3. The antenna system of claim 1, wherein said component section is above said mounting section when said support structure is mounted on said tine.

4. The antenna system of claim 1, wherein the first radio frequency signal is in the functional range of about 800 to 1000 MHz.

5. The antenna system of claim 1, wherein the first radio frequency signal is in the functional range of about 2.4 to 2.5 GHz.

6. The antenna system of claim 1, wherein the antenna system has an adjustable power level to allow for accurate RFID tag reading in different applications.

7. The antenna system of claim 1, wherein the first cover is an abrasion-resistant and impact-resistant dielectric material.

8. The antenna system of claim 1, wherein said support structure has a uniform voltage across the component section at low frequency.

9. The antenna system of claim 1, further comprising a first RF cable to provide RF energy to the first power distribution network, wherein said component section contains a channel for the RF cable to extend along a portion of the length of the component section.

10. The antenna system of claim 1, wherein said antenna is an open-ended waveguide antenna.

11. The antenna system of claim 1, wherein said first radiating element is formed by said first cavity in said component section.

12. The antenna system of claim 1, wherein said radiating element is F-shaped.

13. The antenna system of claim 1, further comprising:
a second cavity in said component section, wherein said second cavity has a second opening;
a second radiating element of conducting material mounted within said second transverse cavity; and
a second cover for said radiating element, said second cover mounted to and essentially flush with the component section so as to permit said radiating element to project a second radio frequency signal through said second opening.

14. The antenna system of claim 13, further comprising a first RF cable to provide RF energy to the first power distribution network, wherein said component section contains a channel for the RF cable to extend along a portion of the length of the component section.

15. The antenna system of claim 14, further comprising a second RF cable and a second power distribution network coupled to a second antenna.

16. The antenna system of claim 15, wherein said first radio frequency signal and said second radio frequency signal are independently controlled by a RFID reader.

17. The antenna system of claim 15, wherein each antenna has an independently adjustable power level.

18. The antenna system of claim 13, wherein said forklift tine is of a length sufficient to accommodate two or more adjacent pallets and wherein each of said openings is essentially aligned under one pallet.

19. The antenna system of claim 13, wherein said first antenna is an inverted F antenna.

20. The antenna system of claim 13, wherein said first antenna is an open-ended waveguide antenna.

21. A method of collecting inventory tracking data in a material handling environment using an integrated forklift tine antenna, said method comprising the steps of:
providing inventory RFID tags on a pallet and/or inventory on the pallet, wherein the inventory RFID tags represent inventory contents;
mounting an antenna on forklift tine using a support structure abapted for mounting on said tine, said support structure including a mounting section and a component section each extending along at least a portion of said support struction, said mounting section configured to secure said support structure to said tine and said component section including at least one cavity in which to mount the antenna;
transmitting a radio frequency signal from the antenna mounted on the forklift tine; and
reading information from the inventory RFID tags using backscatter coupling techniques.

22. The method of claim 21, further comprising the step of communicating the RFID tag information to an inventory management system.

23. The method of claim 21, wherein the radio frequency signal is in the functional range of about 800 to 1000 MHz.

24. The method of claim 21, wherein the radio frequency signal is in the functional range of about 2.4 to 2.5 GHz.

25. The method of claim 21, wherein said antenna is configured to radiate a dual linearly polarized signal.

26. The method of claim 21, wherein a plurality of antennas are located on the forklift tine and 1 to N pallets with product RFID tags are provided so that each of said 1 to N pallets is uniquely identified by one or more of said antennas.

27. The method of claim 26, wherein the power level of the antenna system is adjusted to identify a minimum number of product RFID tags.

28. A tine for a forklift, comprising:
a single piece of rigid material having a vertical portion for mounting to a carriage of a forklift, a horizontal portion for engaging a load, and an elbow portion connecting said vertical portion to said horizontal portion, said horizontal portion including top surface, a bottom surface, a first side surface and a second side surface, wherein said first side surface includes a notch;
an antenna housing mounted in said notch, said housing comprising an opening and a radiating element of conducting material, said housing having a uniform voltage at low frequency, wherein said housing is mounted essentially flush with two of said top, bottom, and first side surfaces with said opening exposed along one of said top, bottom, and first side surfaces so as to project a radio frequency signal from said opening.

29. The tine of claim 28, further comprising a cover for said housing, said cover mounted over said opening and essentially flush with one of said top, bottom, and first side surfaces.

30. The tine of claim 28, wherein the radio frequency signal is in the functional range of about 800 to 1000 MHz.

31. The tine of claim 28, wherein the radio frequency signal is in the functional range of about 2.4 to 2.5 GHz.

32. The tine of claim 28, wherein the antenna system has an adjustable power level to allow for accurate RFID tag reading in different applications.

33. The tine of claim 28, further comprising a radio frequency transmission line, wherein said tine includes a groove extending from said elbow to said notch and said transmission line is mounted in said groove and coupled to said radiating element.

34. The tine of claim 28, further comprising a second notch in which to mound a second antenna housing.

* * * * *